United States Patent [19]

Sugahara

[11] Patent Number: 4,983,995

[45] Date of Patent: Jan. 8, 1991

[54] EXPOSURE DEVICE FOR FORMING PHOSPHOR DEPOSITED SCREEN IN IN-LINE CATHODE RAY TUBE

[75] Inventor: Takashi Sugahara, Nagaokakyo, Japan

[73] Assignee: Mitsubishi Denki Kabushiki Kaisha, Tokyo, Japan

[21] Appl. No.: 337,089

[22] Filed: Apr. 12, 1989

[30] Foreign Application Priority Data

Apr. 13, 1988 [JP] Japan ................................ 63-92163

[51] Int. Cl.[5] ................................ G03B 41/00

[52] U.S. Cl. ................................ 354/1

[58] Field of Search ................................ 354/1

[56] References Cited

U.S. PATENT DOCUMENTS

| | | | |
|---|---|---|---|
| 4,222,642 | 9/1980 | Van Nes et al. | 354/1 |
| 4,670,824 | 6/1987 | Kuki et al. | 354/1 X |

FOREIGN PATENT DOCUMENTS

| | | |
|---|---|---|
| 56-88231 | 7/1981 | Japan . |
| 1156077 | 6/1969 | United Kingdom . |
| 1350976 | 6/1971 | United Kingdom . |
| 1246104 | 9/1971 | United Kingdom . |
| 1358147 | 3/1973 | United Kingdom . |
| 1371301 | 5/1973 | United Kingdom . |
| 1487000 | 12/1975 | United Kingdom . |

*Primary Examiner*—Michael L. Gellner

[57] ABSTRACT

An in-line color cathode ray tube utilizing a finely perforated shadow mask is provided, which includes a highly evacuated envelope having an longitudinal axis and a funnel section which is closed at one end by a generally cylindrical neck section having an in-line electron gun assembly and is closed at the opposite end by a faceplate, an exposure device for forming a mosaic pattern of element color emissive phosphor dots on a screen area of the faceplate, which includes a generally elongated light source, and a slitted member adapted to be disposed between the elongated light source and the faceplate of the evacuated envelope. The slitted member has a slit-shaped light transmissive area defined therein while leaving a light intercepting area around the respective light transmissive area. The light transmissive area has a generally intermediate portion with opposite ends being displaced in a direction parallel to the longitudinal axis of the evacuated envelope.

10 Claims, 5 Drawing Sheets

EXPOSURE DEVICE FOR FORMING PHOSPHOR DEPOSITED SCREEN IN IN-LINE CATHODE RAY TUBE

BACKGROUND OF THE INVENTION

1. Field of the Invention

The present invention generally relates to an in-line color cathode ray tube and, more particularly, to an exposure device used to make a luminescent phosphor deposited screen in an in-line color cathode ray tube.

2. Description of the Related Art

FIG. 1 of the accompanying drawings illustrates a schematic exploded view of a commerial in-line color cathode ray tube utilizing a finely perforated shadow mask that is currently available. The in-line color cathode ray tube illustrate therein includes highly evacuated envelope 13 having a funnel section 14 closed at a rear end thereof by a generally cylindrical neck section 15 and at a front end by a generally rectangular cup-shaped faceplate 16. The faceplate 16 has a generally rectangular inner surface area formed with a predetermined mosaic pattern of color emissive phosphor dots, corresponding to primary element colors (e.g., red, green and blue), to define a luminescent phosphor deposited screen 25 facing towards the interior of the evacuated envelope 13. The evacuated envelope 13 also includes a color selection electrode or a finely perforated shadow mask 17 having a multiple of apertures 18 defined therein in a predetermined pattern said perforated shadow mask 17 is supported in a position within the evacuated envelope 13 while spaced a predetermined distance inward from the luminescent phosphor deposited screen 25. The evacuated envelope 13 further includes an in-line electron gun assembly 19 held in a position within the neck section 15. The in-line electron gun assembly 19 includes three electron guns corresponding to primary element colors (e.g., red, green and blue) and arranged in line with each other and generally parallel to the scan direction of the electron beams emitted therefrom.

For deflecting the electron beams emitted from the in-line electron gun assembly 19 so as to permit the beams to scan the luminescent phosphor deposited screen 25 in a manner well known to those skilled in the art, a deflection yoke 20 having deflection coil assemblies is mounted on the exterior of the evacuated envelope 13 at a position generally aligned with the boundary between the funnel section 14 and the neck section 15.

In the conventional in-line color cathode ray tube utilizing the finely perforated shadow mask 17, the in-line electron gun assembly 19 produces the electron beams corresponding in number to the number of the electron guns, and the number of the primary colors, which electron beams subsequently travel through the fine apertures 18 in the perforated shadow mask 17. By projecting the electron beams through the finely perforated shadow mask 17, any single electron beam impinges upon the color emissive phosphor dots of a particular one of the primary colors. Image reproduction is accomplished by scanning the electron beams across the luminescent phosphor deposited screen.

The degree of coincidence in the geometric positional relationship between any single triad of the color emissive phosphor dots on the luminescent phosphor deposited screen 25 and any single electron beam which has passed through the associated aperture 18 in the finely perforated shadow mask 17 and subsequently impinges only upon such color emissive phosphor dots of a particular one of the primary colors is generally described in terms of the landing characteristic. The higher the degree of coincidence, the better the landing characteristic.

As hereinabove described, in the color cathode ray tube utilizing the finely perforated shadow mask, the magnetic fields generated by the deflection coil pair on the deflection yoke 20 in respective directions perpendicular to each other are utilized to cause the electron beams to deflect so as to scan across the luminescent phosphor deposited screen 25. On the other hand, the deposition of the color emissive phosphor dots on the screen area of the faceplate 16 to provide the luminescent phosphor deposited screen 25 is generally carried out by the use of an exposure system.

During the deposition of the color emissive phosphor dots on the screen area of the faceplate 16, attempts have been made to render the travel path of the light rays from an exposure light source to be aligned with the path of travel of any single electron beam, which may be depicted during the operation of the color cathode ray tube, as close as possible so that the landing characteristic can be favorably improved. An example of the conventional attempts is disclosed in, for example, the Japanese Laid-open Patent Publication No. 56-88231, published July 17, 1981. This prior art reference discloses the exposure system having an exposure light source of a type wherein the virtual center of the exposure light source in the horizontal direction (the widthwise direction of the luminescent phosphor deposited screen) is differentiated from that in the vertical direction. The principle of this prior art reference will now be discussed in detail with particular reference to FIGS. 2(*a*) and 2(*b*).

FIGS. 2(*a*) and 2(*b*) illustrate the exposure light source in the form of a generally cylindrical lamp (a high pressure mercury lamp) 1 in transverse and longitudinal sectional representations, respectively. The cylindrical lamp 1 reproduced therein includes a hollow cylindrical wall 11 made of quartz glass and a light emitting filament 12 extending over the length of the hollow cylindrical wall 11. Between the exposure light source 1 and the luminescent phosphor deposited screen of the faceplate 13 (FIG. 1), there is disposed a slitted member 2 positioned close to the exposure light source 1. The slitted member 2 is in the form of a light shielding plate having three slit-shaped light transmissive areas 21 defined therein while leaving light intercepting areas 22 around the slit-shaped light transmissive areas 21. As best shown in FIGS. 2(*a*) and 2(*b*), each of the slit-shaped light transmissive areas 21 is small in width as measured in an X-axis direction and long in length as measured in a Y-axis direction which is perpendicular to both of X-axis and Z-axis directions, but aligned with the vertical direction of the luminescent phosphor deposited screen 13 (FIG. 1).

With the exposure light source 1 and the slitted member 2 disposed as hereinabove described, the virtual position of the exposure light source as viewed from a point on the faceplate in the X-axis direction coincides with the position of the slitted member 2 while the virtual position of the exposure light source as viewed from a point on the faceplate in the Y-axis direction coincides with the actual position of the exposure light source 1, but not the position of the slitted member 2. In other words, the virtual position of the exposure light source in the X-axis direction is closer to the faceplate than the virtual position of the exposure light source on the Y-axis direction by a distance corresponding to the distance H between the slitted member 2 and the exposure light source 1. Accordingly, the relative position of the center of deflection induced by the horizontal and vertical deflection coils of the deflection yoke which produce the magnetic fields in the respective directions perpendicular to each other is favored, if the horizontal deflection coil is positioned on one side close to the faceplate, because the travel path of the light rays from the exposure light source 1 can be brought into alignment with the path of travel of the electron beams as close as possible.

With the use of the prior art exposure system outlined above, the inventor of the present invention has conducted a series of experiments to form the mosaic pattern of the elemental color phosphor dots. As a result, the following fact has been found.

FIG. 3 illustrates an exemplary pattern of landing on the mosaic pattern of the color emissive phosphor dots. In FIG. 3, reference numeral 25 represents a generally rectangular phosphor deposited screen having the mosaic pattern of the color emissive phosphor dots, and arrows identified by respective reference numerals 41 to 46 represent directions of displacement in landing characteristic (directions of mislanding) which were viewed with the use of a microscope. That is the direction in which the travel path of the electron beams relative to the mosaic pattern of the color emissive phosphor dots should be corrected in order for landing spots of the electron beams to strike upon the corresponding color emissive phosphor dots. Black dots identified by respective reference numerals 47 to 49 represent that the landing displacement is zero.

(a) As shown in FIG. 4, with reference to the relative landing characteristics at corner positions D of the luminescent phosphor deposited screen 25 and position E on the Y-axis thereof, the landing characteristics in the Y-axis direction are opposite to each other, and the difference thereof cannot be corrected. FIG. 3 illustrates that, in such a case, the landing displacement in the Y-axis direction is zeroed at the corner positions and, therefore, the landing displacement in the Y-axis direction appears in a considerable amount on the the Y-axis.

(b) As shown by the arrows 41, 43, 44 and 46 in FIG. 3, the landing displacement in the X-axis direction at the corners of the luminescent phosphor deposited screen 25 cannot be corrected.

In general, the landing displacement occurring at the corners of the luminescent phosphor deposited screen is considered problematic as compared with the landing displacement occurring at other positions of the same luminescent phosphor deposited screen. This is closely associated with the fact that the electron beams directed so as to impinge upon any one of the corner portions of the luminescent phosphor deposited screen are greatly deflected and are consequently apt to be adversely affected by an external magnetic field such as, for example, the terrestrial magnetic field.

Accordingly, it has long been desired that the landing displacement in the X-axis direction at the corner portions of the luminescent phosphor deposited screen such as indicated by the arrows 41, 43, 44 and 46 could be compensated for.

SUMMARY OF THE INVENTION

Accordingly, the present invention has been devised with a view to substantially eliminate the above discussed problems and has for its essential object to provide an improved exposure system for use in the manufacture of the in-line color cathode ray tube utilizing the finely perforated shadow mask, which is effective to minimize the landing displacement which would otherwise occur at the corner portions of the luminescent phosphor deposited screen of the color cathode ray tube.

In order to accomplish the above described object of the present invention, the exposure system herein features each of the slit-shaped light transmissive areas defined in the slitted member, which is positioned so as to permit such slit-shaped light transmissive areas to extend perpendicular to the longitudinal axis of a generally elongated exposure light source, is so shaped as to permit an intermediate portion and opposite ends thereof to be displaced in a direction parallel to the longitudinal axis of the evacuated envelope of the color cathode ray tube.

According to the present invention, since each of the slit-shaped light transmissive areas in the slitted member is curved inward with respect to the exposure light source, as compared with the flat slit-shaped light transmissive areas employed in the conventional exposure system, color emissive phosphor dots can be deposited at such positions on the screen area of the faceplate where the absolute value of X-axis coordinates is large or small. Therefore, any displacement in landing characteristic can be satisfactorily compensated for.

BRIEF DESCRIPTION OF THE DRAWINGS

In any event, the present invention will become more clearly understood from the following description of the prefer red embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

DETAILED DESCRIPTION OF THE PREFERRED EMBODIMENTS

Figure 5:
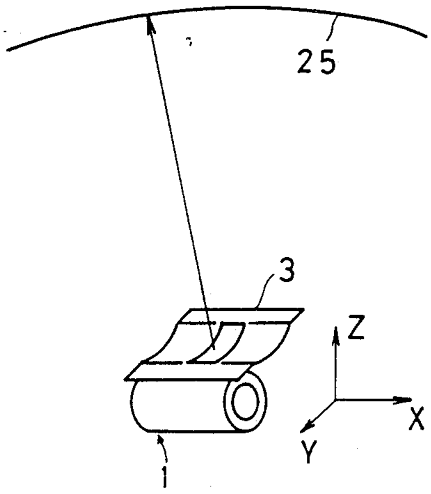
FIG. 5 is a perspective view of an exposure system according to a first preferred embodiment of the present invention.

Referring first to FIG. 5 which illustrate an exposure device according to a first preferred embodiment of the present invention, a slitted member 3 is positioned between the light source 1 and the phosphor deposited screen 25. The details of the slitted member 3 are illustrated in the transverse sectional view in FIG. 6(*a*), as viewed in a direction parallel to the X-axis direction, and in the longitudinal sectional view in FIG. 6(*b*) as viewed in a direction parallel to the Y-axis direction. The slitted member 3 has a slit-shaped light transmissive area 31 defined therein while leaving a light intercepting area 32. In this embodiment, the slitted member 3 having the single transmissive area 31 is shifted to occupy three positions corresponding to the electron beams of the three primary elemental colors, respectively. Alternatively, the slitted member 3 may have three slit-shaped light transmissive areas, one for each exposure light corresponding to one of the primary element colors. The slit-shaped light transmissive area 31 is so shaped as to protrude in a direction parallel to the Z-axis (or the longitudinal axis of the resultant color cathode ray tube) direction and towards the elongated light source 1 so that both an intermediate portion 31*a* and an opposite end portion 31*b* of the slit-shaped light transmissive area 31 can be displaced in a direction parallel to the longitudinal axis Z of the color cathode ray tube. The minimum distance between the elongated light source 1 and the slit-shaped light transmissive area 31 in the slitted member 3 is identified by H.

The operation of the first preferred embodiment of the present invention will now be described. The virtual position of the elongated light source 1 is defined at a position closer to the screen area of the faceplate than the actual position of the elongated light source 1 by a quantity equal to the distance H as far as the X-axis on the screen area of the faceplate is concerned, but is registered with the actual position of the elongated light source 1 as far as the Y-axis on the same screen area of the faceplate is concerned as is the case with the previously discussed prior art exposure system.

Figure 7:
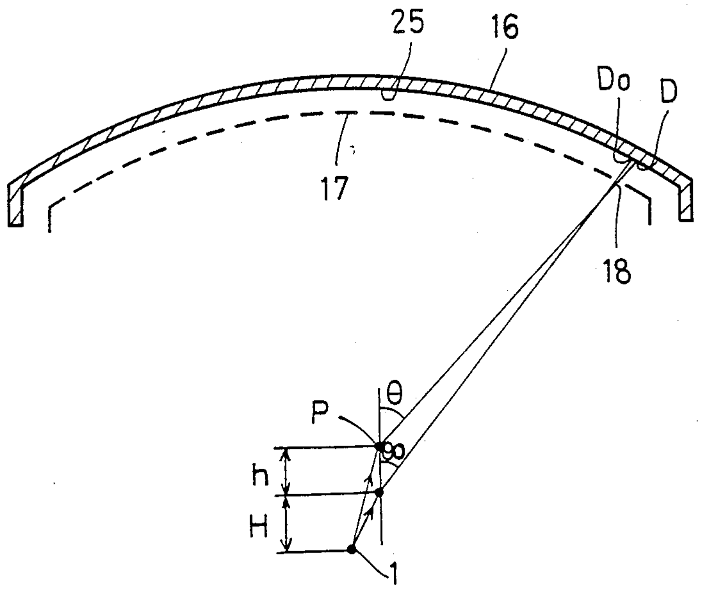
FIG. 7 is a diagram illustrating how the color emissive phosphor dots are formed on the screen area of the faceplate with the use of the exposure system according to the present invention.

The virtual position of the elongated light source 1 as viewed from each corner portion of the screen area of the faceplate is registered with the point P in the slit-shaped light transmissive area 31. Therefore, the virtual position of the elongated light source 1 as viewed from any one of the corner portions of the screen area of the faceplate is defined at a position spaced a distance h away from the virtual position Po of the elongated light source as viewed from a point on the X-axis of the screen area of the faceplate, that is, a point close to the screen area of the faceplate. Accordingly, as shown in FIG. 7, at any one of the positions D corresponding to the corner portions of the screen area of the faceplate, the angle of deflection $\theta$ of the light rays becomes greater than the angle of deflection $\theta o$ exhibited in the prior art exposure system. As a result thereof, the color emissive phosphor dots baked on the screen area of the faceplate by the light rays having passed through the apertures 18 in the finely perforated shadow mask 17 can be formed at respective positions D and each exhibits the greater absolute value of the X-axis coordinate as compared with the position Do at which they are formed when the slit-shaped light transmissive area 31 is flat.

Figure 1:
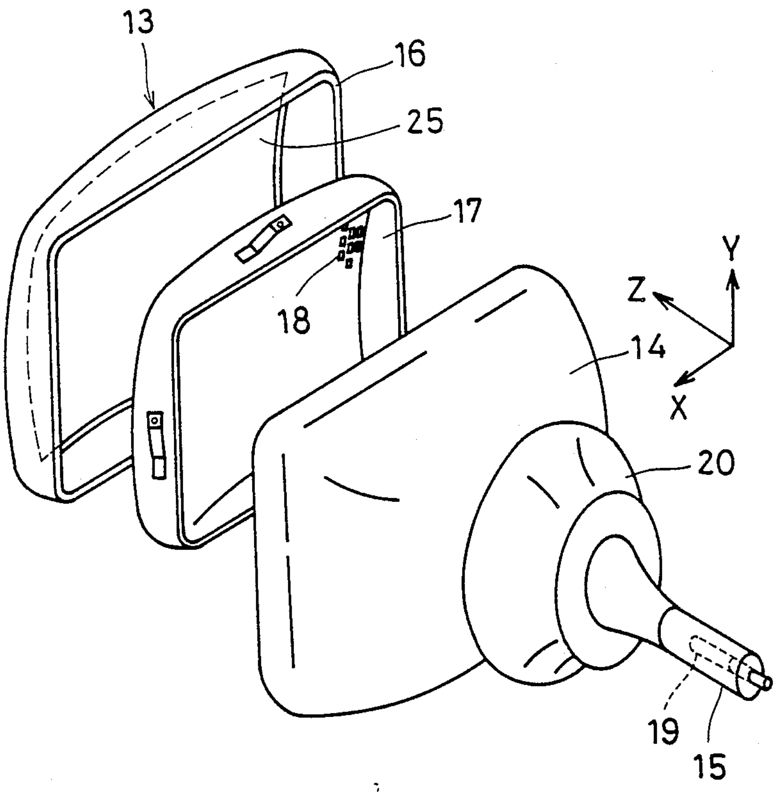
FIG. 1 is a schematic exploded view of the conventional in-line color cathode ray tube of the type utilizing the finely perforated shadow mask.
Figure 2A:
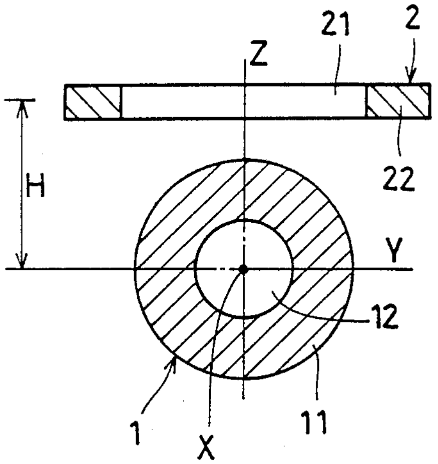
Fig. 2(a) Prior Art
FIGS. 2(*a*) and 2(*b*) are transverse and longitudinal sectional views taken in X-axis and Y-axis directions, respectively, of the prior art exposure system.
Figure 2B:
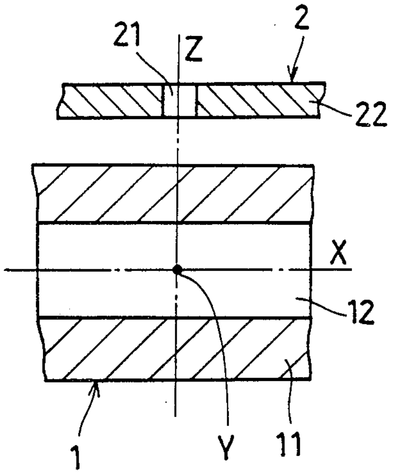
Fig. 2(b) Prior Art
Figure 3:
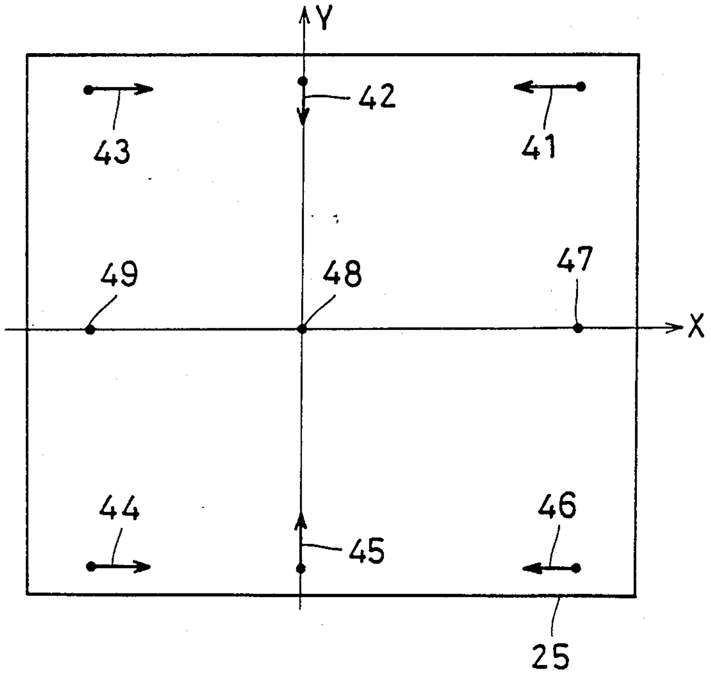
Fig. 3 Prior Art
FIGS. 3 and 4 are schematic diagrams illustrating the luminescent phosphor deposited screen used to explain the landing characteristics of the electron beams.
Figure 4:
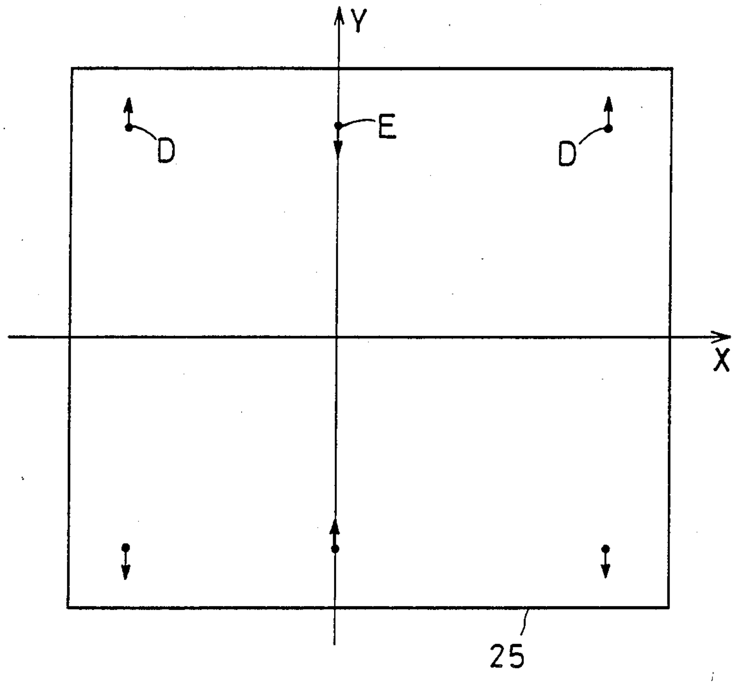
Fig. 4 Prior Art

The pattern of the landing characteristic in FIG. 3 illustrate that the absolute value of the X-axis coordinate is in an increasing direction that is more than the mosaic pattern of the color emissive phosphor dots to which the electron beams correspond. Therefore, when the position of the triads of the color emissive phosphor dots moves to a position where the absolute value of the X-axis coordinate is great, the landing displacement in the X-axis direction can be compensated for.

Figure 8:
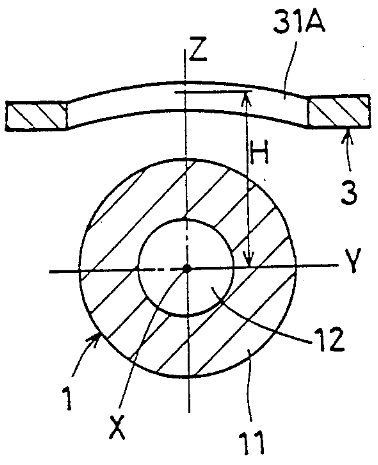
FIGS. 8 and 9 are views similar to FIG. 2(*a*), illustrating an exposure system according to second and third preferred embodiments of the present invention, respectively.

It is to be noted that, although in the embodiment illustrated in and described with reference to FIG. 6 the design has been aimed at correcting the landing displacement occurring at the corner portions of the luminescent phosphor deposited screen and, for this purpose, each slit-shaped light transmissive area 31 has been described as curved inward towards the elongated light source 1, it may happen that the landing displacement would occur in a manner substantially reverse to the landing displacement illustrated in FIG. 3 depending on the characteristics of the exposure optical system. In such a case, the slit-shaped light transmissive area may be so shaped as to protrude towards the faceplate as indicated by 31A in FIG. 8.

Figure 6A:
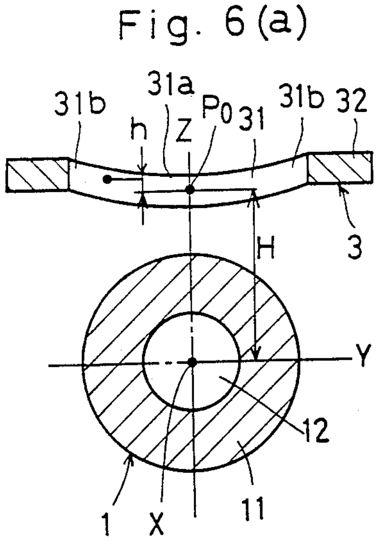
FIGS. 6(*a*) and (*b*) are views similar to FIGS. 2(*a*) and 2(*b*), respectively, of the embodiment illustrated in FIG. 5.
Figure 6B:
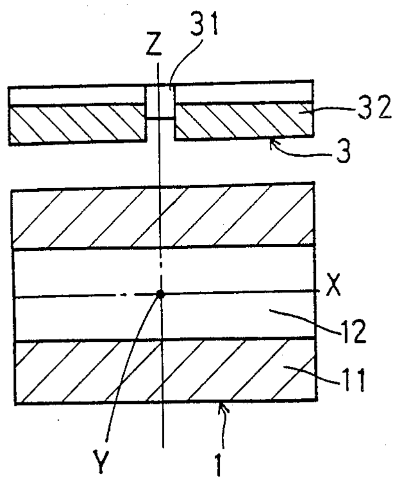
Figure 9:
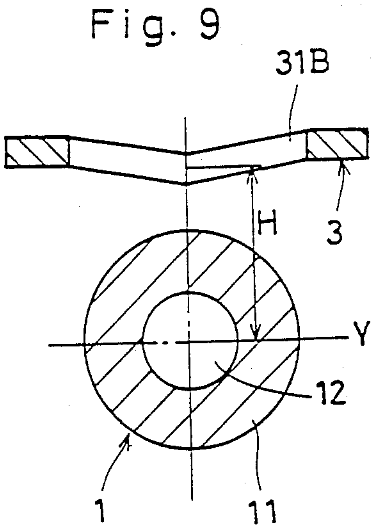

Also, the embodiment illustrated in FIG. 6 the slit-shaped light transmissive area 31 which is curved smoothly, may be so shaped as to bent. That is, a symmetrical relationship with respect to the X-axis may be produced, illustrated by 31B in FIG. 9.

Figure 10A:
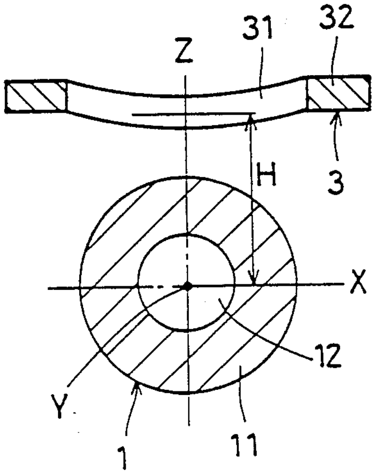
FIGS. 10(*a*) and 10(*b*) are views similar to FIGS. 2(*a*) and 2(*b*), illustrating the exposure system according to a fourth preferred embodiment of the present invention.
Figure 10B:
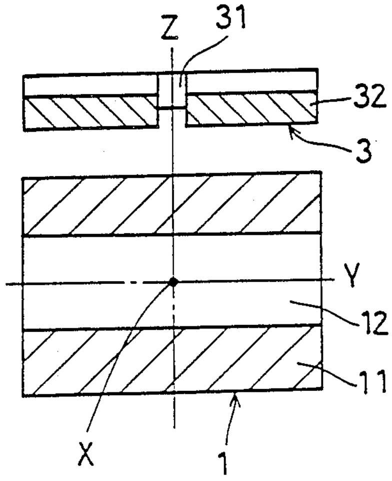

Furthermore, as illustrated in FIGS. 10(*a*) and 10(*b*), where the center of deflection caused by the vertical deflection coil is positioned closer to the faceplate than the center of deflection caused by the horizontal deflection coil, it may be desirable to make the longitudinal axis of the elongated light source aligned with the Y-axis while the slitted member 3 extends with the slit-shaped light transmissive area 31 lying parallel to the X-axis direction.

As hereinbefore fully described, when the slit-shaped light transmissive area in the slitted member has the intermediate portion displaced in the direction parallel to the axis Z with respect to the opposite ends, the landing characteristic exhibited by the color cathode ray tube can be simply and easily improved.

Although the present invention has fully been described in connection with the preferred embodiments thereof with reference to the accompanying drawings used only for the purpose of illustration, those skilled in the art will readily conceive numerous changes and modifications within the framework of obviousness upon the reading of the specification herein presented of the present invention. Accordingly, such changes and modifications are, unless they depart from the spirit and scope of the present invention as delivered from the claims annexed hereto, to be construed as included therein.

What is claimed is:

1. An in-line cathode ray tube apparatus utilizing a finely perforated shadow mask, comprising:

a highly evacuated envelope having a longitudinal axis and a funnel section being closed at one end by a generally cylindrical neck section including an inline electron gun assembly and being closed at an opposite end to said one end by a fireplace;

an exposure device for forming a mosaic pattern of element color emissive phosphor dots on a screen area of said faceplate, said exposure device including a generally elongated light source and a slitted member disposed between said elongated light source and said faceplate of said evacuated envelope;

a slit-shaped light transmissive area defined in said slitted member, said light transmissive area having a generally intermediate portion and opposite end being displaced in a direction parallel to said longitudinal axis of said evacuated envelope, wherein said intermediate portion is located closer to said elongated light source than said opposite ends thereof; and a light intercepting area formed around said light transmissive area.

2. The apparatus as claimed in claim 1, wherein said light transmissive area is smoothly curved in opposite directions away from said intermediate portion thereof towards the opposite ends thereof.

3. The apparatus as claimed in claim 1, wherein said light transmissive area extends straight in opposite directions away from said intermediate portion thereof towards said opposite ends thereof.

4. The apparatus as claimed in claim 1, wherein the longitudinal axis of said elongated light source is registered with an X-axis extending horizontally from the screen area of said faceplate.

5. The apparatus as claimed in claim 1, wherein the longitudinal axis of said elongated light source is registered with an X-axis extending vertically from the screen area of said faceplate.

6. A method for manufactoring an in-line color cathode ray tube apparatus utilizing a finely perforated shadow mask, comprising the steps of:

(a) providing a highly evacuated envelope having a longitudinal axis and a funnel section closed at one end by a generally cylindrical neck section including an in-line electron gun assembly and closed at an opposite end to said one end by a faceplate;

(b) forming a mosaic pattern of element color emmissive phosphor dots on a screen area of said faceplate by an exposure device including a generally elongated light source and a slitted member disposed between said elongated light source and said faceplate of said evacuated envelope;

(c) defining a slit-shaped light transmissive area in said slitted member having a generally intermediate portion and opposite ends being displaced in a direction parallel to said longitudinal axis of said evacuated enveloped wherein said intermediate portion is located closed to said elongated light source than said opposite ends thereof; and (d) forming a light intercepting area around said light transmissive area.

7. The method as claimed in claim 6, wherein said step (c) defines said light transmissive area to be smoothly curved in opposite directions away from said intermediate portion thereof towards said opposite ends thereof.

8. The method as claimed in claim 6, wherein said step (c) defines said light transmissive area to extend straight in opposite directions away from said intermediate portion thereof towards said opposite ends thereof.

9. The method as claimed in claim 6, further comprising the step of registering the longitudal axis of said elongated light source with an X-axis extending horizontally from the screen area of said faceplate.

10. The method as claimed in claim 6, further comprising the step of registering the longitudal axis of said elongated light source with an X-axis extending vertically from the screen area of said faceplate.

* * * * *